Patented Nov. 21, 1922.

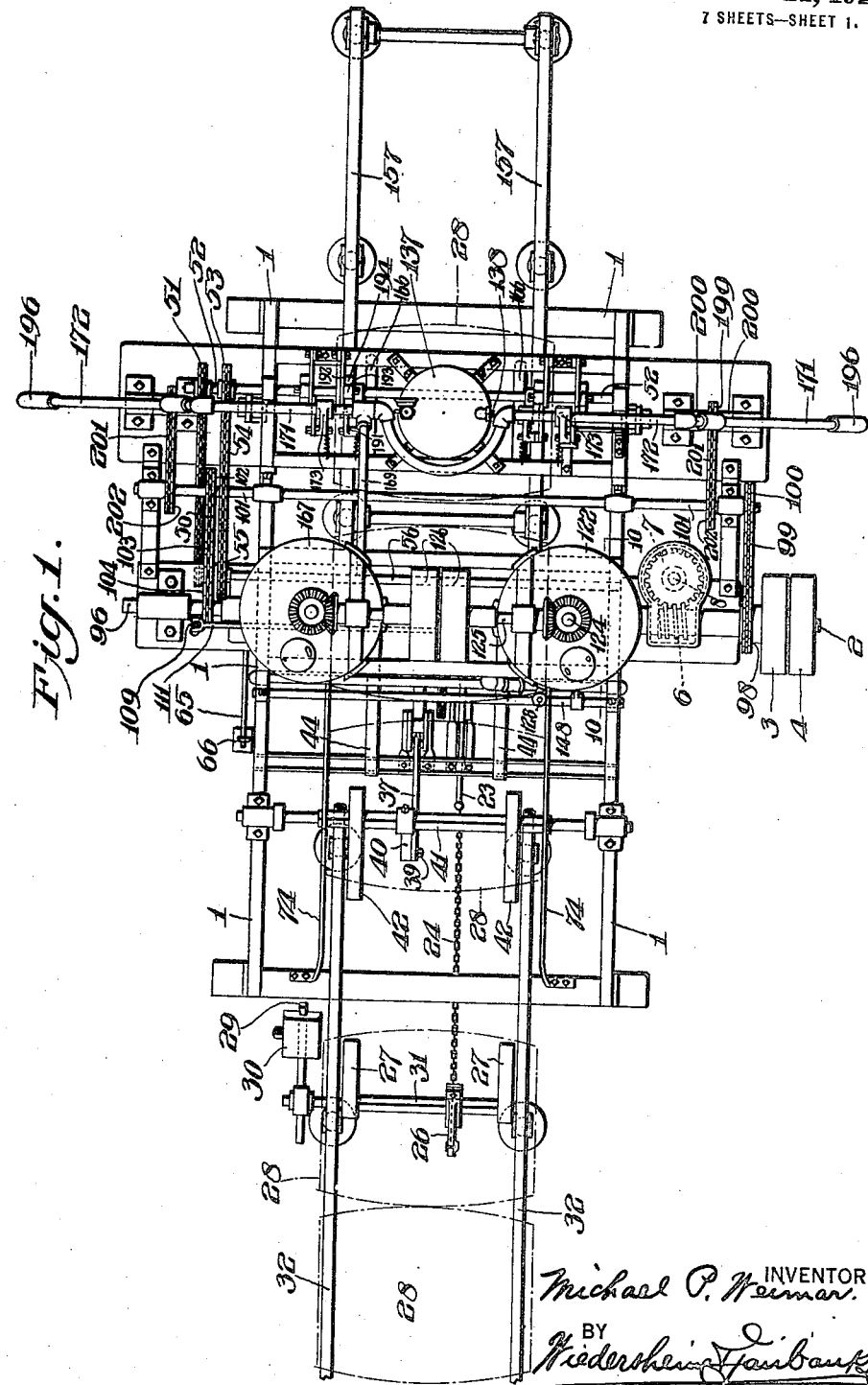

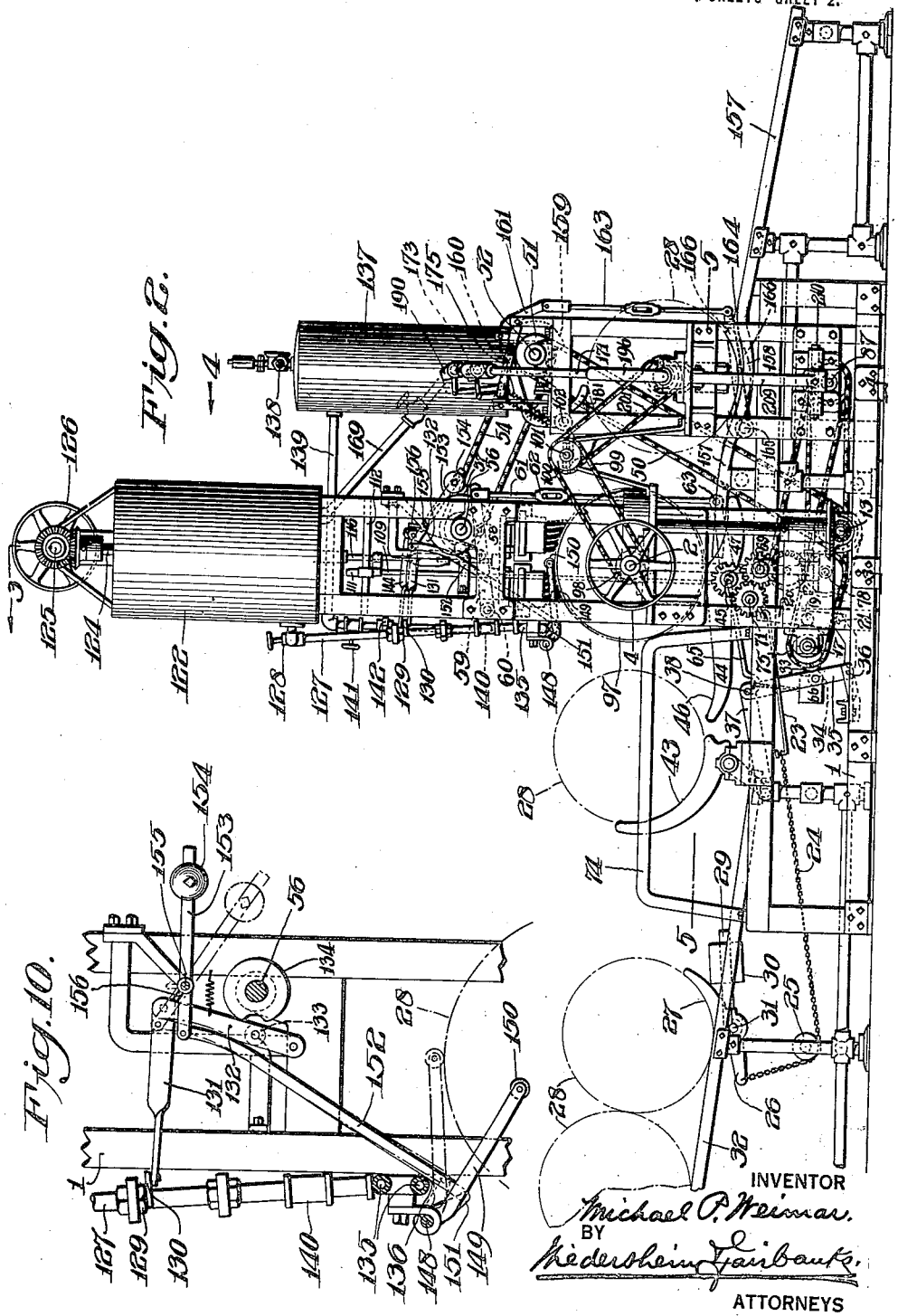

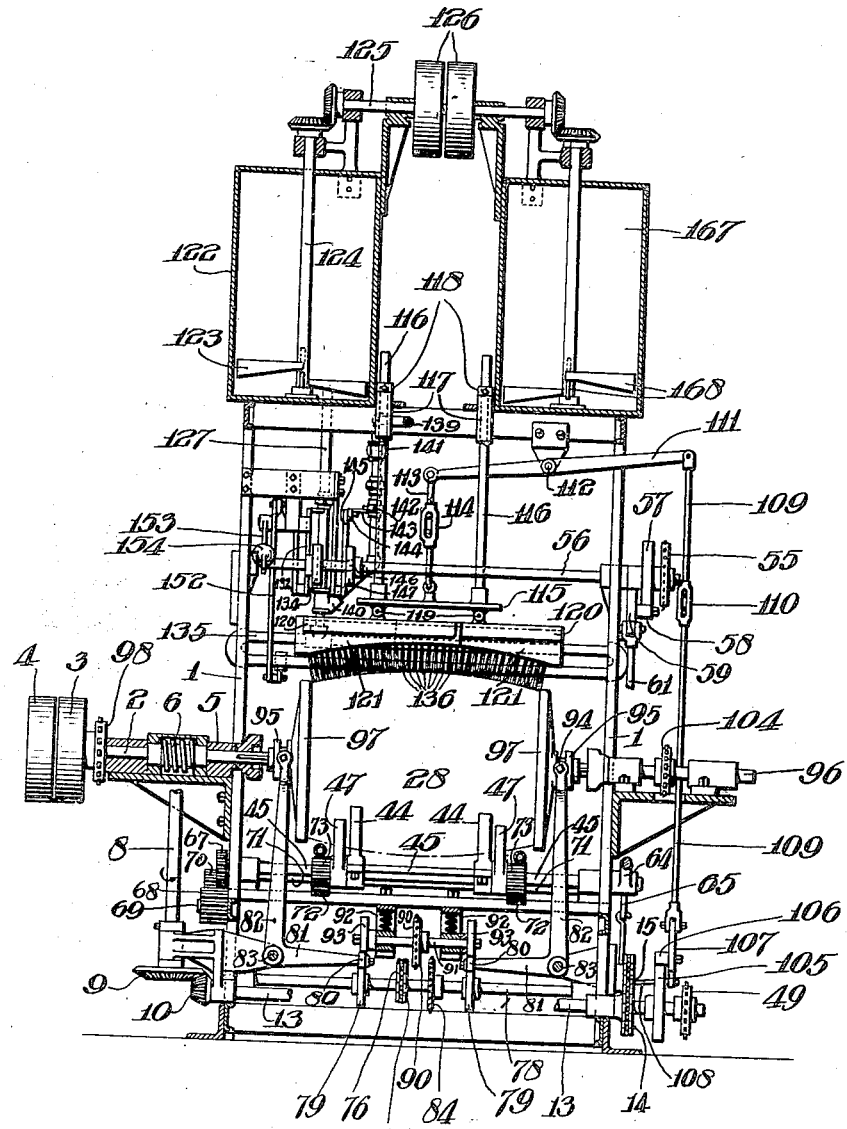

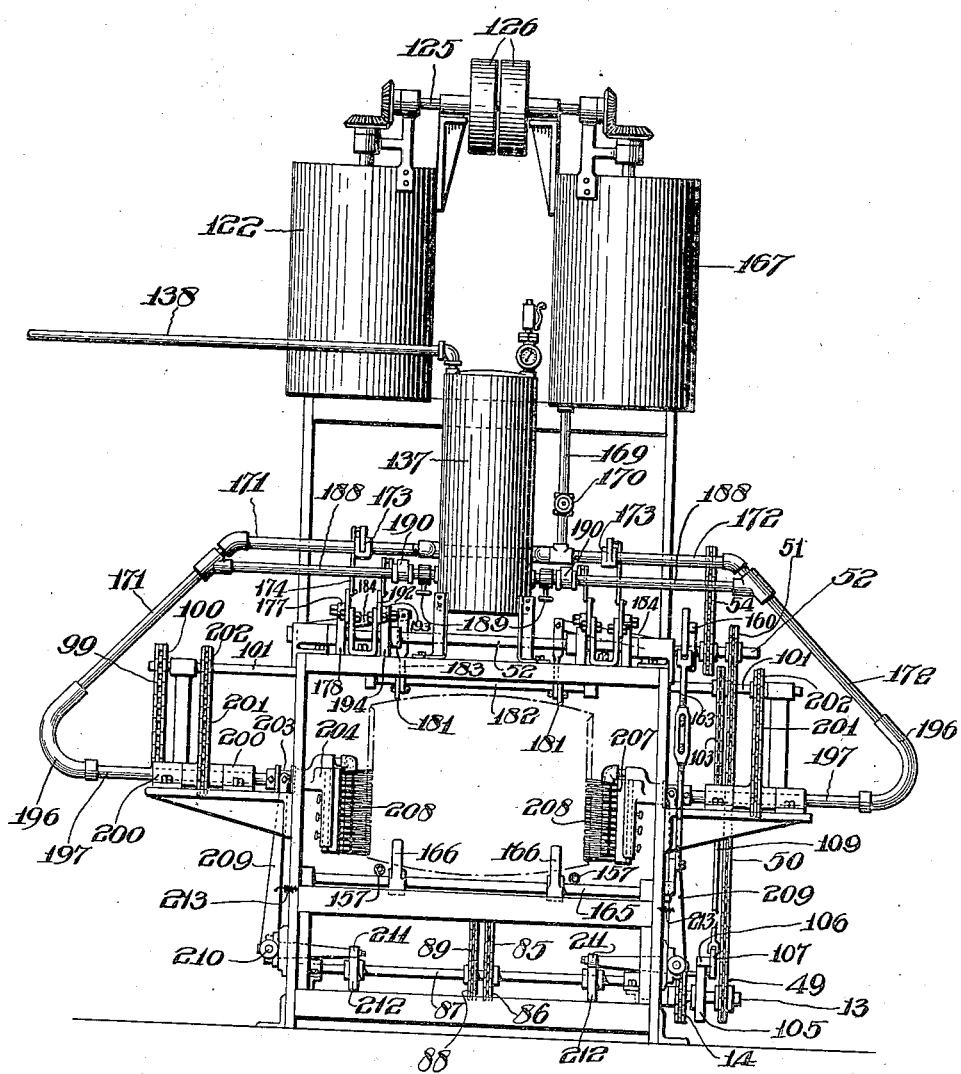

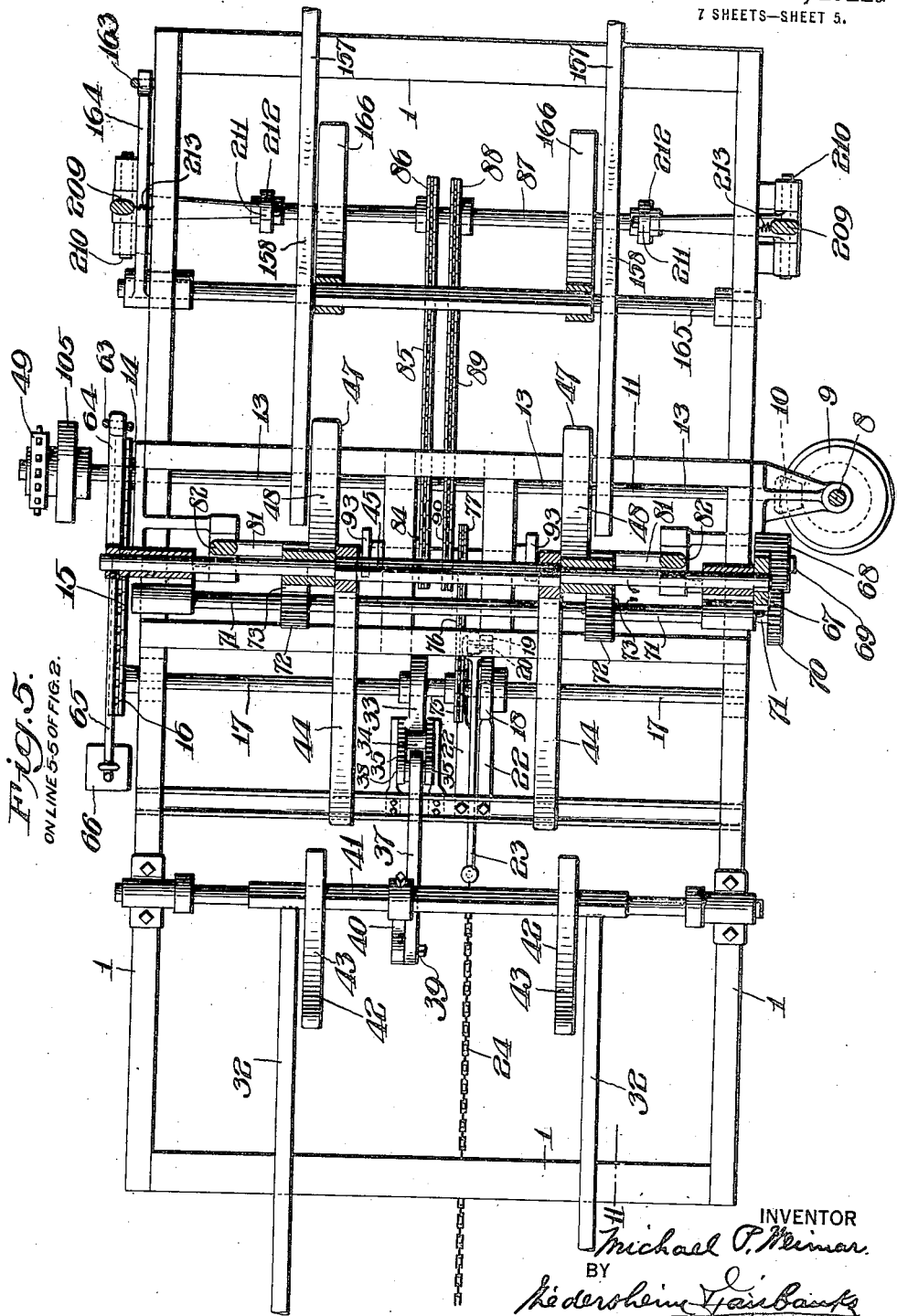

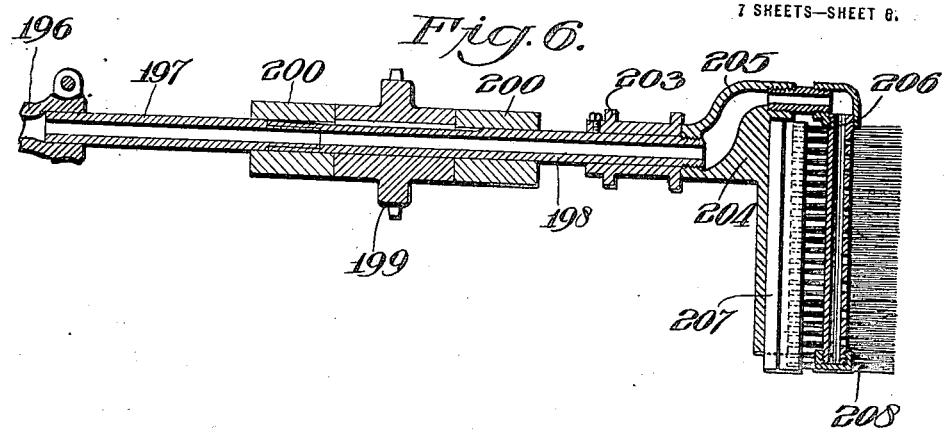
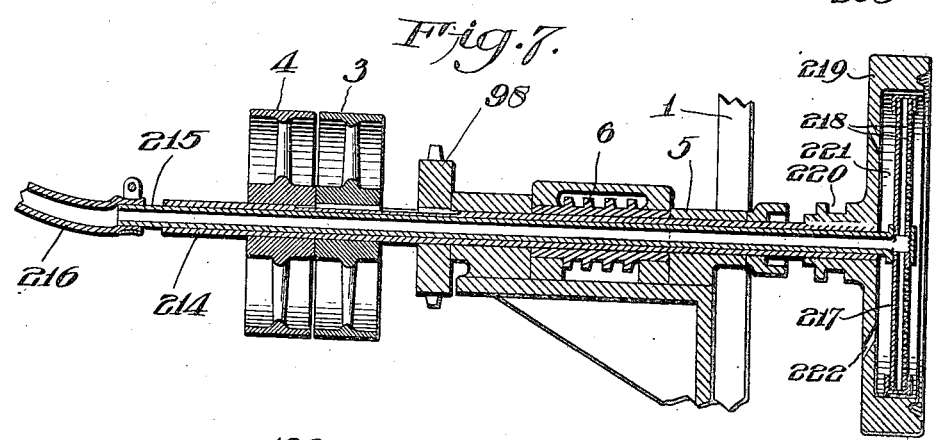
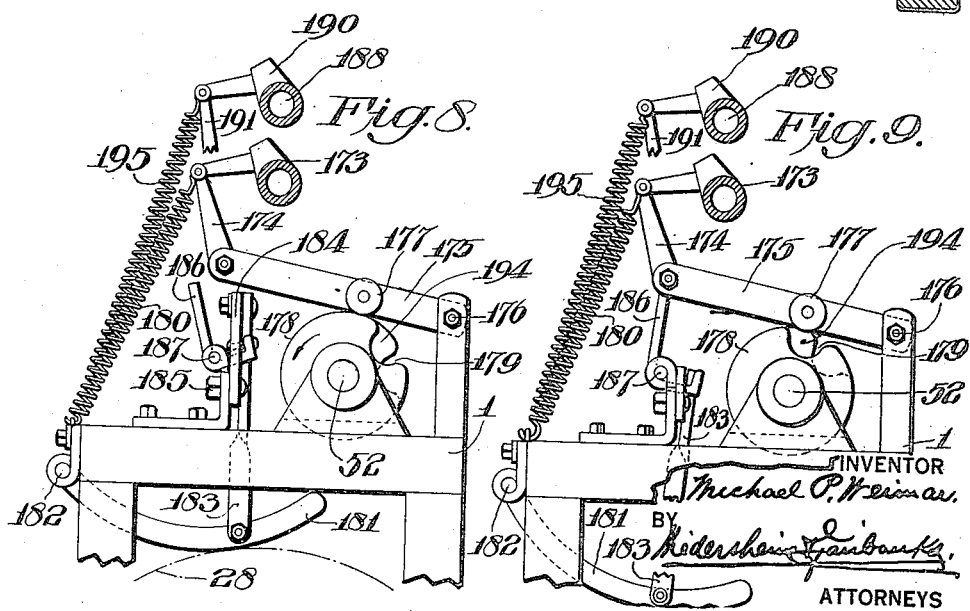

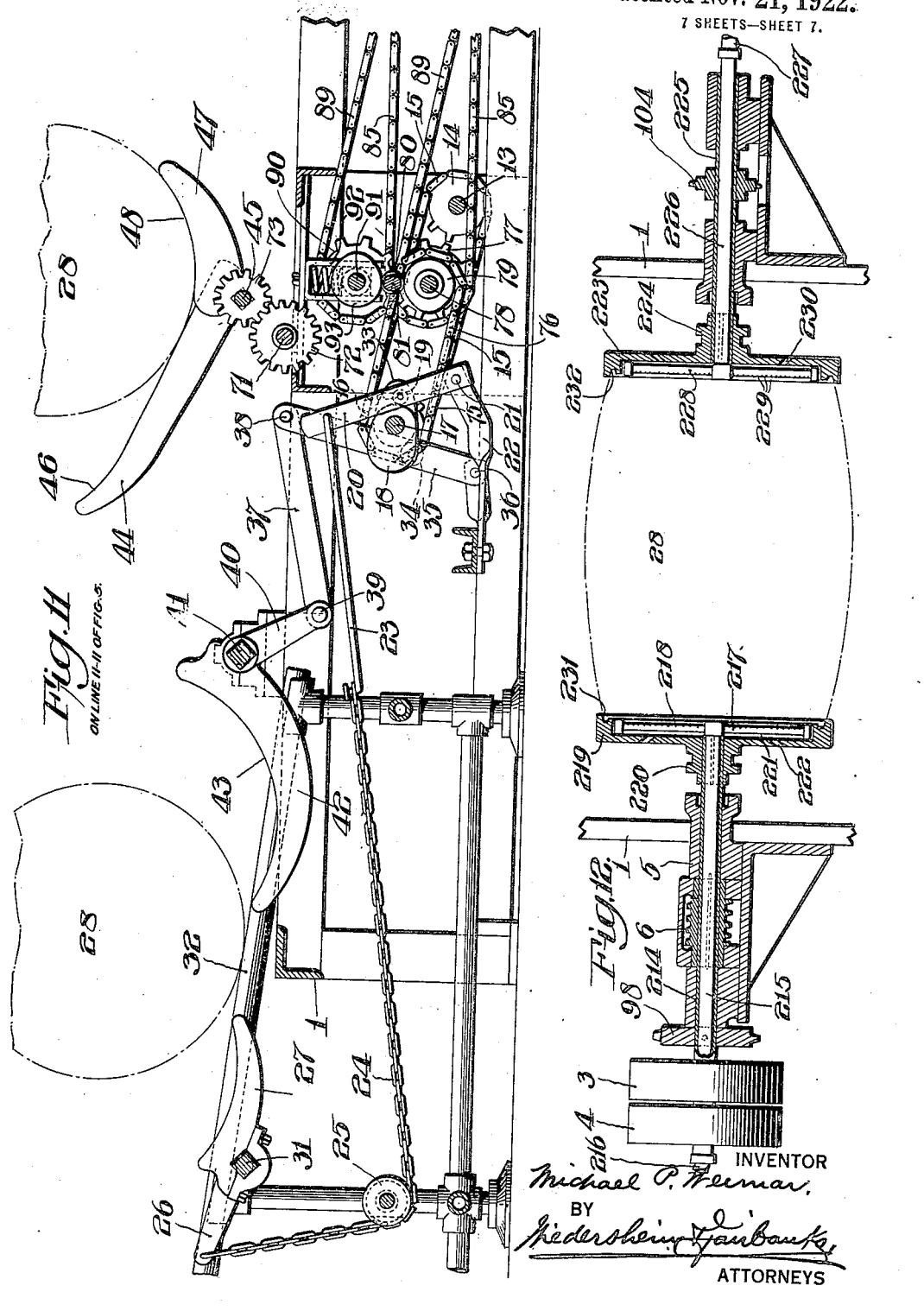

1,436,223

UNITED STATES PATENT OFFICE.

MICHAEL P. WEIMAR, OF PHILADELPHIA, PENNSYLVANIA.

AUTOMATIC BARREL-PAINTING MACHINE.

Application filed March 15, 1921. Serial No. 452,421.

*To all whom it may concern:*

Be it known that I, MICHAEL P. WEIMAR, a citizen of the United States, residing at Philadelphia, county of Philadelphia, State of Pennsylvania, have invented a new and useful Automatic Barrel-Painting Machine, of which the following is a specification.

My present invention comprehends a novel construction and arrangement of a novel automatic barrel painting machine wherein the sides of the barrel are automatically painted and wherein, if desired, the heads of the barrel are also automatically painted, ordinarily with a contrasting color from that of the sides.

It further comprehends novel means for automatically controlling the feed of a barrel into the machine, novel means for automatically raising and revolving the barrel during the painting of its sides, novel means for controlling the feed of the paint during the painting operation, a novel construction and arrangement of brushes, novel means for releasing a barrel and feeding it into position to have its heads painted, novel means for painting the heads of the barrels and novel means for delivering the painted barrels from the machine.

Other novel features of construction and advantage will hereinafter more clearly appear in the detailed description of the invention and the appended claims.

For the purpose of illustrating my invention, I have shown in the accompanying drawings embodiments thereof which are at present preferred by me, since these embodiments will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of an automatic barrel painting machine, embodying my invention.

Figure 2 represents a side elevation thereof.

Figure 3 represents a section on line 3—3 of Figure 2.

Figure 4 represents a section on line 4—4 of Figure 2.

Figure 5 represents, on an enlarged scale, a section on line 5—5 of Figure 2.

Figure 6 represents, in section, one of the head painting brushes and certain of its adjuncts.

Figure 7 represents, in section, another embodiment of my invention which can be employed to apply the paint to the heads of the barrels.

Figure 8 represents, in side elevation and partly in section, the construction for automatically controlling certain of the valves.

Figure 9 represents, in side elevation, a construction similar to that seen in Figure 8 but showing certain of the parts in a different relation from that seen in Figure 8.

Figure 10 represents, on an enlarged scale, a section taken on line 10—10 of Figure 1, certain parts being omitted for sake of clearness of illustration. Figure 11 represents, on an enlarged scale, a section on line 11—11 of Figure 5.

Figure 12 represents, in sectional elevation, another embodiment of my invention in which the barrel rotates and the paint distributing means is stationary.

Similar numerals of reference indicate corresponding parts.

Referring to the drawings.

1 designates the frame or supporting housing of an automatic barrel painting machine, embodying my invention. 2 designates the main driving shaft which is provided with the fast and loose pulleys 3 and 4, respectively, thereby adapting the machine to be driven by a belt although, as will be apparent, it can be driven by any desired source of power.

The driving shaft 2 is mounted in a journal 5 suitably carried by the machine frame and is provided with a worm 6 which meshes with a worm wheel 7, see Figure 1, said worm wheel 7 being mounted on a shaft 8 journalled on the machine frame and provided with a gear 9 which meshes with a gear 10 carried by a transversely extending shaft 13 suitably journalled on the machine frame. The shaft 13 is provided with a sprocket wheel 14, see more particularly Figure 5, around which passes the sprocket chain 15, which also passes around a sprocket wheel 16 carried by a shaft 17 journalled on the machine frame.

The shaft 17 has mounted on it the cam 18, see more particularly Figure 5, and this cam 18 contacts with a roller 19 carried by an arm 20 which is pivotally supported at its lower end, as at 21, in the brackets 22.

The upper end of the arm 20 has connected to it one end of a link 23, the opposite end of which is connected to a cable 24 which passes around a roller 25 mounted in the machine frame and is connected to an arm 26 mounted on a shaft 31 which carries arms 27 the upper faces of which are curved to conform to the periphery of a barrel 28. The shaft 31 has connected to it an arm 29 on which is adjustably mounted the counterweight 30 so that the tendency of the counterweight is to rock the arms 27, thereby permitting a barrel 28 to roll down the receiving tracks or ways 32 which incline downwardly and forwardly.

The mechanism just described explains the construction of the means employed for controlling the feed of the barrel into the machine and to the transfer mechanism which will now be described.

Transfer mechanism.

The shaft 17 also has fixed to it a cam 33 which bears against a roller 34 carried by a pair of arms 35 which are fulcrumed at 36 to a suitable portion of the machine frame.

37 designates a link which is pivoted at 38 to the arms 35 and the opposite end of this link is pivotally connected at 39 to an arm 40 which is fixed to a shaft 41 journalled in the machine frame. The shaft 41 has fixed to it the arms 42, the upper faces of which are curved, as at 43, in order to conform to the periphery of a barrel 38 so that they form a cradle into which a barrel is fed from the barrel feeding mechanism.

The transfer mechanism just described transfers the barrels to mechanism which receives the barrels and raises them into position to be clamped by the barrel rotating devices.

Barrel lifting mechanism.

The cradle formed by the transfer arms 42 passes the barrel on to the levers 44 which are fixed to a shaft 45 journalled in the machine frame, and the upper faces of these levers 44 are curved near their outer ends, as indicated at 46. The shaft 45 has loosely mounted on it the arms 47, the upper faces of which are curved, as indicated at 48. In order to secure the arms 44 to the shaft 45, the shaft 45 is provided with a polygonal shaped portion and the arms 44 are provided with a correspondingly shaped aperture to fit on the polygonal shaped portion of the shaft 45.

The shaft 13, which has already been described, is operatively connected to the driving shaft 2 to be operated by it, and is provided with a sprocket wheel 49 around which passes a sprocket chain 50 which also passes around a sprocket wheel 51 mounted on a shaft 52 journalled in the machine frame. The shaft 52 has mounted on it a second sprocket wheel 53 around which passes a sprocket chain 54 which also passes around a sprocket wheel 55 mounted on a shaft 56 journalled in the machine frame.

The shaft 56 see Figure 3, is provided with a cam 57 which bears against a roller 58 carried by a lever 59 fulcrumed at 60 on the machine frame. The lever 59 has connected to it at its outer end a sectional link 61, the sections of which are connected by means of a turnbuckle 62 in threaded engagement with juxtaposed ends of the sections, whereby the length of this lever may be varied, as desired. The lower end of the link 61 is pivotally connected at 63 to an arm 64 which is fixed to the shaft 45 which has the action of a rock shaft. The shaft 45 has connected with it an arm 65 which carries a detachable counterbalance 66.

Referring now more particularly to Figures 5 and 11, the shaft 45 is provided with a gear 67 which meshes with a gear 68 mounted on a stud shaft 69 carried by the machine frame. The gear 68 meshes with a gear 70 mounted on a shaft 71 journalled in the frame. This shaft 71 is provided with gears 72 which mesh with gears 73 carried by the hub portions of the arms 47. It will thus be seen that when the shaft 45 is rocked in the proper direction, the arms 44 and 47 will raise the barrel received by them from the transfer mechanism into position to be clamped by the barrel rotating devices.

As the barrel passes from the feeding mechanism to the transfer mechanism its ends are guided by the side guides 74 which are preferably in the form of metal or other strips connected with the machine frame, see more particularly Figures 1 and 2.

Barrel clamping devices.

The shaft 17, see more particularly Figures 2 and 5, is provided with a sprocket wheel 75 around which passes a sprocket chain 76 which also passes around a sprocket wheel 77 mounted on a shaft 78 journalled in the machine frame. The shaft 78, see Figure 3, has fixed to it the cams 79 which bear against the rollers 80 carried by the arms 81 of the bell crank levers 82 which are fulcrumed at 83 on the machine frame. The shaft 78 is provided with a sprocket wheel 84 around which passes a sprocket chain 85 which also passes around a sprocket wheel 86 mounted on a shaft 87 journalled in the machine frame. The shaft 87 has also mounted on it a sprocket wheel 88 around which passes a sprocket chain 89 which passes around a sprocket wheel 90 mounted on a shaft 91 which is supported in the spring journal boxes 92 carried by the machine frame, see Figure 3.

The shaft 91 has mounted on it the cams 93 which bear against the rollers 80 of the bell crank levers 82. The upper ends of the bell crank levers 82 form a yoke having the pins 94 which extend into the clutch collars 95 one of which is keyed to the driving shaft 2 and the other of which is keyed to a shaft 96 journalled in the machine frame. These clutch collars 95 carry the clamping discs 97 which clamp against the ends of a barrel 28, as will be understood by reference to Figure 3.

Barrel rotating mechanism.

One of the clamping discs 97 is directly driven by the driving shaft 2, and the other clamping disc 97 is driven at the same speed in a manner which will now be described. The driving shaft 2 is provided with a sprocket wheel 98 around which passes a sprocket chain 99, see Figure 2, which also passes around a sprocket wheel 100, see also Figure 1, mounted on a shaft 101 journalled in the machine frame. The shaft 101 is provided with a sprocket wheel 102 around which passes a sprocket wheel 103 which also passes around a sprocket wheel 104 carried by the shaft 96. It will thus be seen that each clamping disc 97 will be rotated in the same direction and at the same speed.

It will be understood that as soon as the barrel 28 is clamped in position the rock shaft 45 causes the lifting arms 44 and 47 to drop so that the barrel clamped between the discs 97 is free to rotate and is ready to have the paint applied to its sides.

Side painting mechanism.

The shaft 13, see Figure 3, is provided with a cam 105, which bears against a roller 106 carried by an arm 107 which is pivotally supported at its lower end at 108 to a fixed portion of the machine frame. The arm 107 has pivotally connected to it one end of a sectional connecting rod 109 which is provided with a turnbuckle 110 between the juxtaposed ends of the sections whereby the length of the connecting rod 109 may be varied as desired. The rod 109 at its upper end is pivotally connected to a lever 111 which is fulcrumed at 112 on the machine frame, and the opposite end of this lever 111 is provided with a link 113 which is capable of longitudinal adjustment, as the rod 109, being provided with a turnbuckle 114 which connects the sections of the link 113. The link 113 is connected to a supporting head 115 which is provided with the guide rods 116 which are slidable in the sleeves 117 carried by the machine frame. Each rod 116 is provided with a set collar 118 so that the extent of downward movement of the brush supporting head 115 can be varied as desired. The brush supporting head 115 has pivotally connected to it at 119 grooved casings 120 which overlap each other and are each provided with a brush 121, the head of which is slidably mounted in its casing 120.

122 designates a tank supported on the framework of the machine and adapted to receive the paint for painting the sides of the barrel. The tank 122 is provided with the agitator blades 123 mounted on a shaft 124 which is intergeared with a shaft 125 journalled on the machine frame and provided with pulleys 126 which are driven by means of any desired source of power, one of these pulleys being loose on the shaft in the usual manner.

The tank 122 for the side color has leading from it a discharge pipe 127 which is provided with a gate valve 128 which is manually controlled in order to adjust the flow of paint from the tank 122. The flow of paint through the pipes 127 is automatically controlled by means of a valve 129 of any desired or conventional type, the movable part or valve proper of which has connected to it an arm 130, see more particularly Figures 1, 2, 3 and 10. This arm 130 has connected to it one end of a link 131, the opposite end of which is connected to a lever 132 fulcrumed on the machine frame and provided with a roller 133 against which bears a cam 134 mounted on the shaft 56. It will thus be seen that at the proper time the automatically actuated valves which control the flow of paint will be opened so that the paint can pass to the branch pipes 135 which communicate with opposite ends of the discharge nozzle 136 which is provided with a desired number of apertures so that the paint will be discharged against the side of a rotating barrel in advance of the contact points of the brushes. In order that the paint will be forced under pressure against a barrel, I provide a compressed air tank 137 to which the compressed air is conducted by means of a pipe 138 which leads from an air compressor or other source of compressed air supply. The compressed air tank 137 is provided with a discharge pipe 139 which discharges at 140 into the paint discharging pipe 127, see Figure 3, also Figure 2. This pipe 139 is provided with a manually controlled air valve 141 and with an automatically controlled valve 142 which is controlled in a similar manner to the automatically controlled valve in the paint discharge pipe 127. The movable part of the automatically controlled valve 142 has connected to it an arm 143 which is connected by means of a link 144 to a lever 145 fulcrumed on the machine frame and provided with a roller 146 against which bears a cam 147 carried by the shaft 56. The automatically controlled paint valve and air valve are timed so that the paint valve will open slightly prior to the opening of the air valve. The automatic actuated paint valve is provided with means to prevent its operation in case a barrel is not in position to be painted. The machine frame has mounted in it a rock shaft 148, see Figure 2, and connected to this rock shaft 148 is an arm 149 which carries a roller 150 which rides on the periphery of a barrel when it is in position to be painted. The rock shaft 148 has connected to it an arm 151 which is connected to a link 152 which is connected to a lever 153 fulcrumed on the machine frame and provided with an adjustable counterbalance 154. The lever 153 is connected to a shaft 155 journalled in the machine frame and this shaft 155 carries a stop arm 156 which is in the path of the arm 132 so that if a barrel is not in position to be painted the automatically actuated paint valve cannot be automatically opened.

I have found in practice that it is not essential to employ a stop mechanism for the automatically actuated air valve although one may be employed if desired, and its construction and operation, if employed, would be the same as that of the stop mechanism for the paint valve. As soon as the side of the barrel has been painted, the barrel is transferred to mechanism for painting the ends or heads of the barrels since it is customary to paint the heads or ends of the barrels of a different color from that of the sides.

The barrel is now released from its engagement with the clamping discs 97 and drops on to the discharge ways 157 which are provided with a depression 158 which arrests the forward movement of the barrel. The barrel is now raised and maintained in a stationary position during the painting of the heads by mechanism which will now be described.

*Means for holding the barrel stationary.*

The shaft 52, see Figures 2 and 4, carries a cam 159 which bears against the roller 160 carried by a lever 161 which is fulcrumed at 162 on the machine frame. The lever 161 has connected to it a longitudinally adjustable connection 163 which is also connected to an arm 164 which is connected to a rock shaft 165 journalled in the machine frame. The rock shaft 165 carries the curved arms 166 which form a cradle to raise the barrel 28 from the depression 158 and hold the barrel stationary during the painting of its head.

*Head painting mechanism.*

167 designates a tank which receives the color or paint with which the heads of the barrels are to be painted. The tank 167 is provided with an agitator 168 which is intergeared with the shaft 125, see Figure 3. The tank 167 has leading from it a discharge pipe 169 which is provided with a manually controlled valve 170 in order that the flow of the paint may be manually controlled or shut off.

The discharge pipe 169 is provided with the branches 171 and 172, respectively, each of which is provided with an automatically controlled valve 173, and, since the construction of each valve and its operative means is the same, a description of one will suffice for both. The movable part of a valve 173 has connected to it an arm 174 which is connected to a lever 175 which is fulcrumed at 176 on a stationary portion of the machine frame. The lever 175 carries a roller 177 which is actuated by a cam 178 having a recess 179 in its periphery. The cam 178 is mounted on the shaft 52 and actuated by it. The arm 174 has connected to it one end of a spring 180 the opposite end of which is connected to a fixed portion of the machine frame, see more particularly Figures 8 and 9. In order to prevent the valves 173 from being actuated automatically when a barrel is not in a position to have its heads painted, I provide a lever 181 which is fulcrumed at 182 to a fixed portion of the machine frame. This lever 181 has connected to it a link 183, the upper end of which is connected to a lever 184 which is fulcrumed at 185 to a fixed portion of the machine frame. The lever 184 is pivotally connected to a bell crank lever 186 which is fulcrumed at 187 on the machine frame. When the bell crank lever 186 is in the position seen in Figure 9, which is the position it assumes when a barrel is not in position to have its heads painted, it will be apparent that the cams 178 cannot co-operate with the lever 175 and thus prevents the automatic opening of the valves 173.

The compressed air tank 137 has leading from it the pipes 188 each of which is provided with a manually controlled valve 189. One of these pipes 188 discharges into the branch pipe 171 of the paint line and the other pipe 188 discharges into the other branch pipe 172 of the paint line, see Figure 4. Each pipe 188 is provided with an automatically controlled valve 190, each of which is operated from the shaft 52, the construction in each case being the same so that a description of one will suffice for both. The movable part of the valve 190 has connected to it an arm 191 which is connected with a lever 192, the end of which is fulcrumed on the machine frame, and this lever 192 carries a roller 193, which is actuated by a cam 194 carried by the shaft 52. The parts are so timed that the automatic valves 173 open slightly prior to the opening of the air valves 190. The valves 190 are maintained in their closed position by means of springs 195, see Figures 8 and 9. The branch pipe 171 is connected by means of a flexible hose 196 as is also the branch pipe 172 with the pipes 197 which are stationary and mounted in suitable journals on the machine frame but are permitted a requisite longitudinal movement, as will be hereinafter described.

Each pipe 197 is coupled with a pipe 198, see more particularly Figure 6, and to this pipe 198 is keyed a sprocket wheel 199 which is held in position by the bearings 200. 201 designates a sprocket chain which passes around its respective sprocket wheel 199 and also around its respective sprocket wheel 202 on the shaft 101. Each pipe 198 is provided with a collar 203 and also carries a brush carrier 204 having an aperture 205 through it which communicates with a discharge nozzle 206 closed at its outer ends and having a desired number of discharge ports. The brush carrier 204 is grooved to receive the head 207 of a brush 208 in which latter the discharge nozzle 206 is embedded. In order to provide for the in and out movement of the brushes 208 and their adjuncts, the collars 203 have co-operating with them the bell crank levers 209 which are fulcrumed at 210 on the machine frame and provided with rollers 211 which are retained in engagement with the cams 212 by means of the springs 213, see more particularly Figure 4, see also Figure 5. The cams 212 are carried by a shaft 87. It will thus be seen that when a barrel is in position to have its heads painted the brushes 208, which are continuously driven, move towards each other so that they will co-operate with the heads or ends of the barrel. As soon as the painting of the heads is completed the shaft 165 is rocked thereby lowering the arms 166 so that the barrel will be moved by its momentum and the incoming barrel down the incline ways 157 and thus be discharged from the machine to any desired point.

It will of course be apparent to those skilled in the art that the paint can be sprayed against the heads of the barrels at the same time the side of the barrel is being painted, as will be understood by reference to Figures 7 and 12 and the other figures of the drawings. In this embodiment seen in Figures 7 and 12, the pulleys 3 and 4, the sprocket wheel 98 and the worm 6 are mounted on a sleeve 214 journalled in the journal 5 and within this sleeve is mounted a stationary tube 215 which is connected by means of a flexible hose 216 with the pipe 171. The tube 215 at its inner end carries a head 217 in the form of a pipe having its ends closed and provided with ports 218 in its front face.

219 designates a clamping disc keyed to the sleeve 214 and having a clutch collar 220 with which the clutch pins of the lever arm 82 co-operate, see Figure 3. The clamping disc 219 is chambered, as at 221, and is provided with ports 222 in its rear face in order to relieve the pressure. The clamping disc 223 for the opposite end of the barrel is constructed in a similar manner to the clamping disc 219, see Figure 12, and is provided with a clutch collar 224 with which the clutch pins of the opposite lever 82 co-operates, see Figure 3. This clamping disc 223 is keyed to a sleeve 225 journalled in the machine frame and carries a sprocket wheel 104. 226 designates a stationary tube which is connected by means of the flexible pipe 227 with the pipe 172. The stationary tube 226 carries at its end the head 228 having the ports 229, and the rear face of the clamping disc 223 is provided with the relief ports 230. Each clamping disc is preferably provided with an annular groove 231 and 232, respectively, to receive the ends of a barrel.

It will now be understood that in this embodiment of my invention when the barrel is revolving and the side color is being applied, the head color will be applied to the ends of the barrel at the same time during the revolution of the barrel.

The operation of my novel automatic barrel painting machine will now be apparent to those skilled in the art to which this invention appertains and is as follows:—

Assuming now that the tank 122 has been supplied with the desired color for painting the sides of the barrel, the tank 167 has been supplied with the proper color for painting the heads of the barrel and that the compressed air tank 137 is connected with an air compressor or other suitable source of compressed air supply, the machine is ready for operation.

The barrels are fed by gravity down the receiving ways or tracks 32 and the leading barrel is arrested by the stop arms 27 which are now in the position seen in Figure 2. The shaft 17, as before explained, is now rotating so that the cam 18 contacting with the roller 19 on the arm 20 will actuate the link 23 and thereby the cable 24 in a direction to raise the stop arms 27. The continued revolution of the shaft 17 will at the proper time permit the counterbalance 30 to rock the shaft 31 and thereby permit the leading barrel to pass to the arms 43 of the transfer mechanism, which are at this time in the position seen in Figure 11. These arms are controlled by the cams 33 on the shaft 17 so that at the proper time the transfer arms 43 will be raised, by the rocking of the shaft 41 on which they are mounted, and the barrel will be transferred to the barrel elevating or lifting mechanism, which includes the arms 44 and 47. The shaft 45 is operatively connected, as before explained, with the main drive to effect the rocking at the proper time of such rock shaft 45 so that the arms 44 will be rocked upwardly and the arms 47, which are intergeared with the shaft 71 which in turn is intergeared with the shaft 45, will also be rocked upwardly, so that the barrel will be raised into position to be clamped. The shaft 78 is operatively connected with the main drive to be driven by it and the cam 79 mounted on said shaft, see Figure 3, will rock the bell crank levers 82 in a direction to move the clamping members 97 into engagement with the ends of the barrel.

As these clamping members 97 are revolving, the barrel clamped between them will be revolved. The cam 105 on the shaft 13 will cause the brush supporting head 115 to be lowered so as to bring the brushes into contact with the side of the barrel and the automatic valve 129 will be opened as well as the automatically controlled valve 142 of the compressed air line 139, so that the paint will impinge against the side of the barrel through the discharge nozzles 136 and the brushes will work the paint against the side of the barrel. When the painting of the side of the barrel is completed the automatically controlled valve in the paint pipe and the automatically controlled valve in the compressed air pipe will be closed, and the brush carrying head 115 will be moved away from the side of the barrel. The bell crank levers 82 are now rocked on their fulcrum to effect the outward movement of the clamping discs 97, so that the clamping mechanism will be released and the barrel, the side of which has been painted, will roll onto the discharging ways 157 and be arrested by the depression 158.

The rock shaft 165 which carries the cradle forming arms 166 carries said arms to raise the barrel and hold it stationary during the painting of the heads. The cams 212 on the shaft 87, which is driven in the manner before explained, now rock the levers 209 to cause the brushes 208 to be moved into engagement with the head and the brush carrier 204, and its adjuncts will be moved towards the head of the barrel. The discharge pipe 169 from the tank 167 which contains the head color is provided with automatically controlled valves 173 which are now open as well as the automatically controlled air valves 190 so that the paint is sprayed against the heads of the barrel. The discharge nozzles 206 are driven from the shaft 101 so that during the operation of painting the heads of the barrel the barrel is retained stationary and the brushes and the nozzles revolve.

As soon as the operation of painting the heads of barrel is completed, the automatically controlled paint valves and air valves close and thereafter the shaft 165 is rocked and the painted barrel rolls onto the discharge ways or tracks 157 and is discharged from the machine to any desired location. The automatically controlled valves which control the passage of both paint and compressed air for painting both the sides and heads of the barrels are only rendered operative when a barrel is in position to have its sides or heads painted, as clearly set forth in the detailed description.

Referring now to the embodiments seen in Figures 7 to 12, I have shown herein a mechanism for painting the heads of the barrels simultaneously with the operation of painting the side of the barrel, in which case the clamping members for engaging the ends of the barrel are mounted on sleeves which revolve on the discharge ends of the pipes leading from the head color tank, the pipes in this case being stationary and provided with nozzles so that during the revolution of the barrel the paint is sprayed against the head of the barrel as well as against its side.

It will be apparent that in accordance with my present invention a large number of barrels can be painted in a minimum amount of time since they are being continuously fed into the machine and while one barrel is passing to the transfer mechanism the side of one barrel is being painted and the heads of a different barrel are being painted although, as will be apparent, the painted sides and heads of the same barrel can be simultaneously painted if desired. Special attention is directed to the fact that in accordance with my present invention the machine is entirely automatic in its action and all that is necessary to do is to keep a supply of color in the paint tanks and there will be a continuous passage of barrels through the machine.

It will now be apparent that I have devised a novel and useful construction of an automatic barrel painting machine which embodies the features of advantage enumerated as desirable in the statement of the invention and the above description, and while I have, in the present instance, shown and described preferred embodiments thereof which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is:—

1. In a barrel painting machine, means controlling the feed of barrels into the machine, means to elevate a barrel, clamping mechanism clamping the barrel when in elevated position, means to revolve the barrel when in clamped position, and means to paint the side of the barrel during its revolution.

2. In a barrel painting machine, means controlling the feed of barrels into the machine, means to elevate a barrel, clamping mechanism clamping the barrel when in elevated position, means to revolve the barrel when in clamped position, means to paint the side of the barrel during its revolution, and means to paint the heads of the barrels.

3. In a barrel painting machine, means controlling the feed of barrels into the machine, means to elevate a barrel, clamping mechanism clamping the barrel when in elevated position, means to revolve the barrel when in clamped position, means to paint the side of the barrel during its revolution, means to paint the heads of the barrels, and means to effect the discharge of the painted barrels from the machine.

4. In a barrel painting machine, means to paint the sides of the barrel with one color of paint, means to paint the heads of the barrels with a contrasting color of paint, said means being automatically controlled and devices to feed the barrel from one painting means to the next painting means.

5. In a barrel painting machine, receiving ways on which the barrels are fed by gravity, an automatically controlled stop for the leading barrel, transfer mechanism to which a barrel is fed when released by said stop, barrel elevating mechanism to which a barrel is passed from said transfer mechanism, means to clamp a barrel in its elevated position, means to revolve a barrel when in clamped position, means to apply paint to the side of the barrels, means to effect the release of said clamping mechanism, means to effect the forward feed of the barrel when released by the clamping mechanism, and head painting mechanism to which the barrel is fed.

6. In a barrel painting machine, means to automatically control the feed of the barrels into the machine, means automatically controlled to elevate a barrel, means to revolve a barrel when in elevated position, means automatically controlled to apply paint to the sides of the barrel, and means automatically controlled to paint the heads of the barrels.

7. In a barrel painting machine, means to automatically control the feed of the barrels into the machine, means automatically controlled to elevate a barrel, means to revolve a barrel when in elevated position, means automatically controlled to apply paint to the sides of the barrel, and means automatically controlled to paint the heads of the barrels with a contrasting color from that of the sides.

8. In a barrel painting machine, receiving ways on which the barrels are fed by gravity, means to automatically control the feed of barrels into the machine, means mechanically controlled to elevate the barrels, clamping members automatically controlled to clamp the ends of the barrels, means to revolve the clamping members, and means automatically controlled to paint the barrels.

9. In a barrel painting machine, clamping members for the ends of the barrel, means to revolve the barrel by revolution of said clamping members, means automatically controlled to apply paint to the sides of the barrel during its revolution, and means to paint the heads of the barrels.

10. In a barrel painting machine, barrel receiving ways, an automatically controlled stop for the barrels, an automatically controlled transfer mechanism for the barrels, barrel rotating mechanism to which a barrel is fed from the transfer mechanism, a tank for the side color having an automatically controlled discharge pipe, means to feed compressed air to said discharge pipe, said pipe discharging against the side of the barrel during its revolution, and brush means acting against the side of the barrel throughout its length.

11. In a barrel painting machine, barrel receiving ways, an automatically controlled stop for the barrels, an automatically controlled transfer mechanism for the barrels, barrel rotating mechanism to which a barrel is fed from the transfer mechanism, a tank for the side color having an automatically controlled discharge pipe, means to feed compressed air to said discharge pipe, said pipe discharging against the side of the barrel during its revolution, brush means acting against the side of the barrel throughout its length, a tank for the head color having an automatically controlled discharge pipe to apply the paint to the heads of the barrels, and means to admit compressed air into said discharge pipe.

12. In a barrel painting machine, means to apply paint to the side of a barrel, a tank for the head color having automatically controlled discharge pipes, means to discharge compressed air into said pipes, revolving brushes and paint discharge nozzles, the latter communicating with said pipes, means to feed a barrel into proximity to said brushes, and means to automatically move said brushes with respect to the heads of the barrel.

13. In a barrel painting machine, means mechanically controlled to feed a barrel into position to be painted, means to revolve a barrel when in painting position, means automatically controlled to feed and apply paint to the sides of the barrel, and means to render said paint applying means inoperative when a barrel is not in position to be painted.

14. In a barrel painting machine, means to control the feed of barrels into the machine, barrel transfer mechanism to which the barrels are fed, barrel elevating mechanism comprising movable arms onto which a barrel is passed from the transfer mechanism, clamping members to engage the ends of the barrel, means to move said members toward each other to clamp the barrel when in elevated position, means automatically controlled to paint the barrel, and means to effect the discharge of the barrel from the machine.

15. In a barrel painting machine, means to automatically control the feed of barrels into the machine, clamping members to engage the ends of the barrel, means to move said clamping members into and away from clamping position, means mechanically controlled to revolve said clamping members and thereby the barrel, overlapping brushes, means automatically controlled to bring said brushes into engagement with the side of the barrel, and means to discharge paint against the side of the barrel.

16. In a barrel painting machine, clamping means for the barrel, means mechanically controlled to revolve said clamping means and thereby the barrel, means mechanically controlled to apply paint to the side of the barrel, a brush carrying head, and means to automatically bring said head into a position to cause the brushes to bear against the side of the barrel during the application of paint thereto.

17. In a barrel painting machine, barrel receiving ways, a rock shaft suitably journalled, stop arms on said shaft, transfer arms to which a barrel is fed when released by said stop arms, barrel elevating mechanism to which a barrel is transferred by said transfer mechanism, means to rotate said barrel, when elevated, mechanism for applying paint to said barrel, and means for occasioning the cyclical operation of said rock shaft, said barrel elevating mechanism, said barrel rotating means and said paint applying mechanism.

MICHAEL P. WEIMAR.

Witnesses:
  HENRY P. WEIMAR,
  ELSIE KUGLER.